United States Patent
Wang et al.

(10) Patent No.: US 12,503,620 B2
(45) Date of Patent: Dec. 23, 2025

(54) THIN LAYER UV CURING COATING ON NON-WOVEN FACERS

(71) Applicant: Owens Corning Intellectual Capital, LLC, Toledo, OH (US)

(72) Inventors: Xin Wang, Fort Mill, SC (US); Paul Geel, Heveadorp (NL)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 745 days.

(21) Appl. No.: 17/311,086

(22) PCT Filed: Dec. 18, 2019

(86) PCT No.: PCT/US2019/067040
§ 371 (c)(1),
(2) Date: Jun. 4, 2021

(87) PCT Pub. No.: WO2020/131990
PCT Pub. Date: Jun. 25, 2020

(65) Prior Publication Data
US 2021/0332260 A1 Oct. 28, 2021

Related U.S. Application Data

(60) Provisional application No. 62/781,770, filed on Dec. 19, 2018.

(51) Int. Cl.
*C09D 163/10* (2006.01)
*C09D 4/00* (2006.01)
(Continued)

(52) U.S. Cl.
CPC ............. *C09D 163/10* (2013.01); *C09D 4/00* (2013.01); *C09D 183/10* (2013.01);
(Continued)

(58) Field of Classification Search
CPC ........ B32B 2307/554; B32B 2307/246; B32B 2307/3065; B32B 2307/712;
(Continued)

(56) References Cited

U.S. PATENT DOCUMENTS 3,842,559 A * 10/1974 Payne ..................... E04D 11/02
52/793.1
5,288,523 A 2/1994 Klaiber et al.
(Continued)

FOREIGN PATENT DOCUMENTS

CA 2774509 A1 10/2013
DE 102017001274 A1 8/2018
(Continued)

OTHER PUBLICATIONS

Communication from EP Application No. 19848914.8 dated Jul. 15, 2022.
(Continued)

*Primary Examiner* — Camie S Thompson
(74) *Attorney, Agent, or Firm* — Calfee, Halter & Griswold LLP

(57) ABSTRACT

A UV-cured coated facer includes a non-woven mat having a first side and a second side and an intermediate coating disposed on the first side of the non-woven mat. The intermediate coating includes a coating binder and a filler. The UV-cured coated facer also includes a UV-curable coating composition disposed on the intermediate coating, wherein the UV-curable coating composition is essentially free of a filler.

16 Claims, 6 Drawing Sheets

(51) Int. Cl.
*C09D 183/10* (2006.01)
*D06N 3/00* (2006.01)
*D06N 3/04* (2006.01)

(52) U.S. Cl.
CPC .......... *D06N 3/0011* (2013.01); *D06N 3/042* (2013.01); *D06N 2211/06* (2013.01)

(58) Field of Classification Search
CPC .......... B32B 2262/14; B32B 2262/101; B32B 2262/02; B32B 2260/044; B32B 2260/021; B32B 2255/26; B32B 2255/28; B32B 2255/20; B32B 2255/02; B32B 5/02; B32B 13/00; E04C 2/10; E04C 2/14; D06M 15/17; D06M 11/76; D06N 3/00; D06N 3/12; D06N 3/0011; D06N 3/042; D06N 2211/06; C09D 163/10; C09D 4/00; C09D 183/10
USPC ..... 442/59; 428/703; 52/309, 536, 615, 731, 52/619, 570, 596, 599, 602, 609, 508, 52/409, 479
See application file for complete search history.

(56) References Cited

U.S. PATENT DOCUMENTS

| | | |
|---|---|---|
| 6,277,939 B1 | 8/2001 | Smith |
| 6,316,089 B1 | 11/2001 | Ohtani et al. |
| 7,087,696 B2 | 8/2006 | Wiesendanger et al. |
| 7,323,248 B2 | 1/2008 | Ramsey |
| 7,553,780 B2 | 6/2009 | Smith |
| 8,268,737 B1 | 9/2012 | Kumar |
| 9,475,967 B2 | 10/2016 | Lipscomb et al. |
| 9,701,802 B2 | 7/2017 | Bushmire et al. |
| 2004/0170873 A1* | 9/2004 | Smith .................. G02B 6/2852 428/703 |
| 2008/0124576 A1 | 5/2008 | Elliott |
| 2017/0326761 A1 | 11/2017 | Springer |

FOREIGN PATENT DOCUMENTS

| | | |
|---|---|---|
| EP | 1801278 A1 | 6/2007 |
| WO | 2000014358 A2 | 3/2000 |
| WO | 2004055286 A2 | 7/2004 |
| WO | 2004094723 A1 | 11/2004 |

OTHER PUBLICATIONS

International Search Report and Written Opinion from PCT/US2019/067040 dated Mar. 26, 2020.
Office Action from CA Application No. 31,123,938 dated Oct. 22, 2024.

* cited by examiner

THIN LAYER UV CURING COATING ON NON-WOVEN FACERS

CROSS-REFERENCE TO RELATED APPLICATIONS

This application is the U.S. national stage entry of PCT/US2019/067040, filed on Dec. 18, 2019, which claims priority to and any benefit of U.S. Provisional Patent Application No. 62/781,770, filed Dec. 19, 2018, the entire contents of which are incorporated herein by reference.

FIELD OF THE INVENTION

The present disclosure relates to a UV-curable coating system for nonwoven fiber mats, particularly nonwoven fiber mats used as a facer in construction boards or materials. The UV-curable coating system of the present disclosure provides desirable properties to the nonwoven mat including desirable porosity, abrasion resistance, and improved process ability.

BACKGROUND OF THE INVENTION

Fiber mats, such as fiberglass mats, have been employed as facers in construction boards such as polymeric foam and gypsum boards. Nonwoven fiber mats may be used as facers to prepare construction boards with specific properties such as increased dimensional stability in the presence of moisture, increased biological resistance, increased air permeability, and greater physical and mechanical properties, such as better strength and durability, compared to conventional construction boards faced with paper or other cellulosic facing materials. Often, the fiber mats include a coating such as an aqueous-coating composition that is heat cured.

UV-curable coatings have traditionally been used on temperature sensitive substrates, like wood, paper and plastics. In recent years, the market for UV-curable coatings has expanded to other applications, such as protective coatings on automotive interior and exterior, refrigerators, washing machines, cell phones and tablets. Presently there are few reports of the use of UV-curable coatings in non-woven technologies.

U.S. Pat. No. 8,268,737 describes an insulation board that includes an electron-beam or ultraviolet curable resin-based coating compound on a substrate like fiber-glass mat. The electron-beam or ultraviolet curable resin-based uses a monomeric composition that includes from 5 weight percent to 95 weight percent filler. In embodiments where the monomeric composition will be cured by ultra violet light, the U.S. Pat. No. 8,268,737 patent calls for a level of 20 weight percent to 80 weight percent filler.

Presently there is a need in the art for non-woven facers with improved properties, such as abrasion resistance and reduced porosity, for use in construction boards.

SUMMARY OF THE INVENTION

One or more embodiments provide a UV-cured coated facer comprising a non-woven mat having a first side and a second side; an intermediate coating disposed on the first side of the non-woven mat; where the intermediate coating comprises a coating binder and a filler; and a UV-curable coating composition disposed on the intermediate coating, wherein said UV-curable coating composition is essentially free of a filler.

Other embodiments also provide a method for preparing a coated facer comprising: providing a non-woven fiber mat; forming an intermediate coating on the glass fiber mat by coating the glass fiber mat with a coating composition including a coating binder and a filler; coating the intermediate coating with UV-curable coating composition; and supplying a light source to cure the UV-curable coating composition, wherein said UV-curable coating composition is essentially free of a filler.

DETAILED DESCRIPTION OF THE INVENTION

Figure 1:
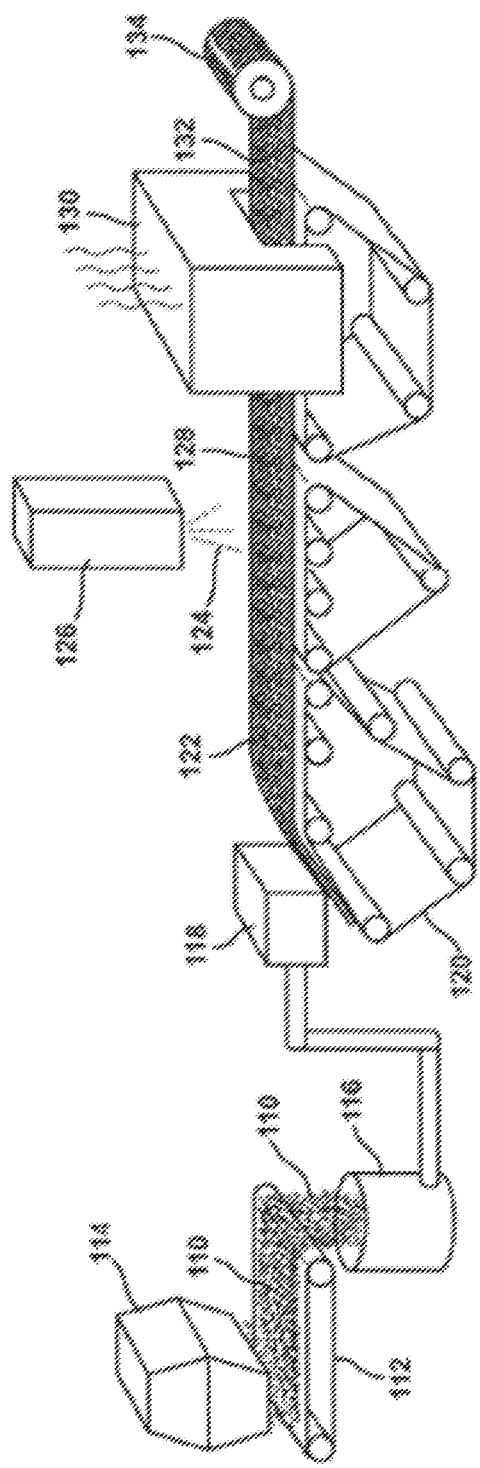
FIG. 1 illustrates a schematic view of an apparatus for preparing a nonwoven.

Unless otherwise defined, all technical and scientific terms used herein have the same meaning as commonly understood by one of ordinary skill in the art to which this application pertains. Although other methods and materials similar or equivalent to those described herein may be used in the practice or testing of the exemplary embodiments, exemplary suitable methods and materials are described below. In case of conflict, the present specification including definitions will control. In addition, the materials, methods, and examples are illustrative only and not intended to be limiting of the general inventive concepts.

The terminology as set forth herein is for description of the exemplary embodiments only and should not be construed as limiting the application as a whole. Unless otherwise specified, "a," "an," "the," and "at least one" are used interchangeably. Furthermore, as used in the description of the application and the appended claims, the singular forms "a," "an," and "the" are inclusive of their plural forms, unless contradicted by the context surrounding such.

Unless otherwise indicated, all numbers expressing quantities of ingredients, chemical and molecular properties, reaction conditions, and so forth used in the specification and claims are to be understood as being modified in all instances by the term "about." The term "about" means within +/−10% of a value, or in some instances, within +/−5% of a value, and in some instances within +/−1% of a value.

Embodiments are based, at least in part, on the discovery of coated facer that includes a non-woven fiber mat, an intermediate coating, and a UV-curable coating. The coated facer includes a non-woven fiber mat having a first side and a second side, opposite the first side. An intermediate coating is disposed on the first side of the non-woven fiber mat. In one or more embodiments, the intermediate coating includes a coating binder and a filler. Disposed on the intermediate coating of the coated facer is a UV-cured coating. In one or more embodiments, the UV-cured coating may be prepared by applying the UV-curable coating composition to the intermediately coated facer and supplying a light source to cure the UV-curable coating composition. For the purpose of this disclosure, the coated facer that includes a UV-cured coating disposed on an intermediate coating may be referred to as the UV-coated facer. Advantageously, the UV-coated facer may have excellent scratch resistance and/or a high air resistance. In one or more embodiments, the coated facer may be used to prepare construction materials, such as construction boards.

In one or more embodiments, the non-woven fiber mat is web of intermingled, randomly oriented fibers that have been bonded together by chemical, mechanical, heat, or solvent treatment. Fibers include any material having a fibrous structure as its elemental structural component. As used herein, the term "fiber" encompasses fibers, filaments, wool, yarns, tows, and the like. In one or more embodiments, the non-woven fiber mat may include discrete fibers, such as chopped fibers, or continuous fibers, or mixture of discrete fibers and continuous fibers.

Suitable fibers for use in the non-woven fiber mat include, but are not limited to, glass fibers, carbon fibers, mineral fibers such as mineral wool and rock wool, ceramic fibers, natural fibers, and/or synthetic fibers. The glass fibers can be made from any type of glass. Examples of glass fibers include A-type glass fibers, C-type glass fibers, E-type glass fibers, S-type glass fibers, ECR-type glass fibers (e.g., Advantex® glass fibers commercially available from Owens Corning), Hiper-tex™ glass fibers, wool glass fibers, and combinations thereof. Natural fibers are plant fibers extracted from any part of a plant, including, but not limited to, the stem, seeds, leaves, roots, or phloem. Examples of natural fibers which may be suitable for use as the reinforcing fiber material include basalt, cotton, jute, bamboo, ramie, bagasse, hemp, coir, linen, kenaf, sisal, flax, henequen, and combinations thereof. Synthetic fibers are man-made fiber having suitable reinforcing characteristics, such as polyester, polyethylene, polyethylene terephthalate, polypropylene, polyamide, aramid, and polyaramid fibers, as well as combinations thereof.

In one or more embodiments, the fibers may have an average diameter between about 2 microns and about 24 microns. In these or other embodiments, the fibers may have an average diameter of about 3 microns to about 20 microns, in other embodiments of about 5 microns to about 16 microns, in other embodiments of about 6.5 microns to about 16 microns, in other embodiments of about 8 microns to about 15 microns, and in other embodiments of about 10 microns to about 14 microns. In certain embodiments, where the fibers are chopped fibers, the fibers may be described by the average length of the fibers. In these or other embodiments, the fibers may have an average length of about 4 millimeters to about 32 millimeters, in other embodiments of about 8 millimeters to about 28 millimeters, and in other embodiments of about 16 millimeters to about 24 millimeters. In certain embodiments, for example where the fiber is a glass wool, the fibers may have an average diameter between about 3 microns and about 20 microns.

Nonwoven fiber mats, or veils, generally comprise randomly matted glass fibers bonded together by a cured thermoset or dried thermoplastic polymeric binder. The processes for forming such mats are generally well known, including, for example, the well-known wet-laid processing and dry-laid processing methods. One exemplary wet-laid process for forming nonwoven fiber mats, specifically nonwoven glass fiber mats, is shown in FIG. 1. Chopped glass fibers 110 may be provided to a conveying apparatus such as a conveyor 112 by a storage container 114 for conveyance to a mixing tank 116 that may contain the white water (e.g., various surfactants, viscosity modifiers, de-foaming agents, and/or other chemical agents) with agitation to disperse the fibers and form a chopped glass fiber slurry (not shown). The glass fiber slurry may be transferred to a head box 118 where the slurry is deposited onto a conveying apparatus such as a moving screen or foraminous conveyor 120, and a substantial portion of the water from the slurry is removed to form a web (mat) 122 of enmeshed fibers. The water may be removed from the web 122 by a conventional vacuum or air suction system (not shown).

A binder 124 is then applied to the web 122 by a suitable binder applicator, such as the spray applicator 126 or a curtain coater (not illustrated). Once the binder 124 has been applied to the mat 122, the binder coated mat 128 is passed through at least one drying oven 130 to remove any remaining water and cure the binder composition 124. The formed non-woven fiber mat 132 that emerges from the oven 130 is an assembly of randomly oriented, dispersed, individual glass fibers. The fiber mat 132 may be rolled onto a take-up roll 134 for storage or later use as illustrated.

A dry-laid process is a process in which fibers are chopped and air blown onto a conveyor, after which a binder is then applied and cured to form the mat.

In one or more embodiments, a binder composition may be used to bind the web of unbound fibers. In these or other embodiments, the binder composition may be applied to one or more surfaces of the web of unbound fibers using a binder applicator. Suitable application methods include, but are not limited to, curtain coaters, spray coaters, dip coaters, reverse roll, knife over roll and the like. After the binder composition is applied, the binder composition may be cured, for example through heat curing.

Suitable binder compositions include both thermoset and thermoplastic binder compositions. Thermoset binder compositions useful in nonwoven fiber mats generally require a low viscosity in the uncured state, yet are able to form a semi-rigid or rigid mat for the fibers when cured. In some exemplary embodiments, the binder composition may be formaldehyde-based, such as urea-formaldehyde-based binder compositions, urea-melamine binder compositions, and those formaldehyde-based binder compositions modified with a styrene-butadiene rubber latex, an acrylic emulsion, or a styrene/acrylic emulsion. Non-exclusive examples of suitable urea formaldehyde resins include Casco-Resin FG-472X (available commercially by Hexion), GP-2928 and GP-2981 (available commercially from Georgia Pacific), and Dynea Prefere 2118-54 (available commercially from Dynea).

Alternatively, formaldehyde-free (or no-added formaldehyde ("NAF") binders may be employed, such as carboxyl-based binder compositions, polyvinyl alcohol-based binder compositions, carbohydrate-based binder compositions, and the like. Such binders are free of added formaldehyde and are environmentally friendly, i.e., "green."

In some exemplary embodiments, the binder composition comprises one or more of any water-based polymer emulsion or solution. Suitable water-based polymer emulsion or solution include, but are not limited to, acrylic emulsions, acrylic solutions, polyvinyl alcohol solutions, or mixtures thereof. Examples of acrylic emulsion binders include, but are not necessarily limited to, Rhoplex GL-618 and Rhoplex GL-720 (available commercially from Dow Chemical) and Acronal DS 2396 (available commercially from BASF). The binder may optionally contain conventional additives for the improvement of process and product performance such as dyes, oils, biocides, fillers, colorants, UV stabilizers, coupling agents (e.g., aminosilanes), lubricants, wetting agents, surfactants, and/or antistatic agents.

In one or more embodiments, the nonwoven fiber mat may be described by the percent weight of the binder composition out of the total weight of the binder composition and the fibers of the nonwoven fiber mat. In these or other embodiments, the binder composition may comprise from about 5 to about 25 weight percent, in other embodiments from about 8 to about 20 weight percent, in other embodiments from about 10 to about 18 weight percent, in other embodiments from about 12 to about 15 weight percent the binder out of the total weight of the binder composition and the fibers of the nonwoven fiber mat.

As indicated above, the UV-coated facer includes an intermediate coating composition. In one or more embodiments, the intermediate coating composition includes a filler and coating binder. In these or other embodiments, the coating binder serves to bind the filler together as well as bind the entirety of the intermediate layer to the fiber mat.

As indicated above, the intermediate coating composition includes a filler, which may also be referred to as a mineral pigment. Examples of fillers suitable for making coated mats include, but are not limited to, ground limestone (calcium carbonate), clay (kaolin), sand, mica, talc, gypsum (calcium sulfate dihydrate), aluminum trihydrate (ATH), vermiculite, antimony oxide, or a combination of any two or more of these substances.

In one or more embodiments, the amount of filler in the intermediate coating composition may be described as a percent weight of filler based on the weight of the total solids (the non-water portion of the intermediate coating composition) in the intermediate coating composition. In one or more embodiments, the intermediate coating composition may include about 65% to about 95% filler, in other embodiments, about 75% to about 90% filler, and in other embodiments about 80% to about 85% filler based on the weight of the total solids in the intermediate coating composition.

Suitable binder compositions for use as the coating binder include polymeric binders. In certain embodiments, the polymeric binder may be a latex binder. Exemplary polymeric binders include one or more polymers selected from styrene-butadiene-rubber (SBR), styrene-butadiene-styrene (SBS), ethylene-vinyl-chloride (EVCl), poly-vinylidene-chloride (PVdC), modified poly-vinyl-chloride (PVC), poly-vinyl-alcohol (PVOH), ethylene-vinyl-actate (EVA), and poly-vinyl-acetate (PVA). In one or more embodiments, the coating binder is a polymer or copolymer of acrylic acid, methacrylic acid, acrylates, methacrylates, acrylonitrile, and combinations thereof.

In one or more embodiments, the amount of coating binder in the intermediate coating composition may be described as a percent weight of coating binder based on the weight of the total solids (the non-water portion of the intermediate coating composition) in the intermediate coating composition. In one or more embodiments, the intermediate coating composition may include about 2% to about 20% coating binder, in other embodiments, about 4% to about 15% coating binder, about 5% to about 10% coating binder, and in other embodiments about 5.5% to about 6.5% coating binder based on the weight of the total solids in the intermediate coating composition.

In one or more embodiments, the intermediate coating composition may be an aqueous coating composition. In these or other embodiments, the amount of water in the intermediate coating composition may be described as a percent weight of water based on the weight of the total solids (the non-water portion of the intermediate coating composition) in the intermediate coating composition. In one or more embodiments, the intermediate coating composition may include about 15% to about 60% water, in other embodiments about 20% to about 50% water, and in other embodiments about 30% to about 40% water based on the weight of the total solids in the intermediate coating composition.

In one or more embodiments, the intermediate coating composition may optionally include a biocide. The fouling of non-woven mats and facers primarily occurs through accumulated charged particles, biological growth, and fungal growth. Biological or fungal attacks are more typically a problem in pools, showers, and other hot, humid environments, but can also occur in any surface covering or dry wall application. Examples of suitable biocides include diiodomethyl-p-tolylsulfone, glutarealdehyde, isothiazolin, zinc oxide, zinc omadine, and silver. To prevent discoloration or unwanted microbiological or fungal attack, the biocides, such as antimicrobial and/or antifungal agents may be present in the intermediate composition. In these embodiments, the intermediate coating composition may include about 0.01% to about 0.15% biocide based on the weight of the total solids in the intermediate coating composition.

In one or more embodiments, the intermediate coating composition may optionally include a defoaming agent. In these embodiments, the intermediate coating composition may include about 0.01% to about 0.5%, in other embodiments from about 0.05% to about 0.4%, and in other embodiments from about 0.1% to about 0.3% defoaming agent based on the weight of the total solids in the intermediate coating composition. Suitable examples of defoaming agents include siloxanes, mineral oil, and polyoxalkylene.

In one or more embodiments, the intermediate coating composition may optionally include a dispersant. In these embodiments, the intermediate coating composition may include about 0.01% to about 0.5%, in other embodiments from about 0.05% to about 0.4%, and in other embodiments from about 0.1% to about 0.3% dispersant based on the weight of the total solids in the intermediate coating composition. Suitable examples of dispersants include olefinic dispersants, fatty derivative, and acrylic copolymer.

In one or more embodiments, the intermediate coating composition may optionally include a colorant. In these embodiments, the intermediate coating composition may include about 0.01% to about 3%, in other embodiments from about 0.1% to about 2%, and in other embodiments from about 0.5% to about 1.5% colorant based on the weight of the total solids in the intermediate coating composition. Suitable examples of colorants include blue, green, and black pigments.

In one or more embodiments, the intermediate coating composition may include a viscosity modifier. In these embodiments, the intermediate coating composition may include about 0.01% to about 0.5%, in other embodiments from about 0.05% to about 0.4%, and in other embodiments from about 0.1% to about 0.3% viscosity modifier based on the weight of the total solids in the intermediate coating composition. Suitable examples of viscosity modifiers include polyacrylamide, alkali swellable emulsion (HASE/ASE type), and hydrophobically modified ethoxylated urethane (HEUR).

The intermediate coating composition may also optionally contain conventional additives such as dyes, coupling agents, fillers, thermal stabilizers, anti-oxidants, wetting agents, colorants, and UV stabilizers. In one or more embodiments, the amount of additives present in the coating composition may be from about 0.1% to about 3.0%, in other embodiments from about 0.3% to about 2.5%, in other embodiments from about 0.5% to about 2.0%, in other embodiments from about 0.7% to about 1.8% based on the weight of the total solids in the intermediate coating composition.

Suitable methods for applying the intermediate coating composition to the fiber mat include, but are not limited to, roller coating, impregnation coating, curtain coating, knife coating, brush coating, dip coating, and spray coating. After the intermediate coating composition is coated on the fiber mat, the intermediate coating composition may be cured. Suitable methods for curing the intermediate coating composition include, for example, heat curing.

In one or more embodiments, the intermediate coating composition may be applied in an amount on a dry basis of about 10 grams per m$^2$, to about 400 grams per m$^2$, in other embodiments about 50 grams per m$^2$, to about 300 grams per m$^2$, and in other embodiments about 100 grams per m$^2$, to about 250 grams per m$^2$.

As will be appreciated by those skilled in the art, the extent to which the intermediate coating composition penetrates into the fiber mat is influenced on the one hand by the properties of the fiber mat itself and on the other hand by the various coating parameters such as the coating viscosity, the time between applying the coating and curing the coating (e.g., the speed of the coating line), the rate of application of the coating, the method by which the coating is applied and the like. Varying these parameters to obtain the desired extent of penetration in any particular mat requires no more than routine experimentation to those skilled in the art.

In one or more embodiments, the intermediate coating composition is applied such that it penetrates into and envelopes the fibers of the fiber mat to a depth of from about 25 percent to about 75 percent of the thickness of the coated glass fiber mat, in other embodiments from about 30 percent to about 60 percent of the thickness of the coated glass fiber mat, in other embodiments from about 35 percent to about 50 percent of the thickness of the coated glass fiber mat. In some exemplary embodiments, the intermediate coating composition is impregnated fully (i.e., 100%) through the thickness of the fiber mat.

UV-Curable Coating Composition

Suitable UV-curable coating compositions for use in preparing the UV-coated facer may have a viscosity that allows for coating the composition on to the intermediate layer and will form a solid coating when irradiate with UV-light. In one or more embodiments, the UV-curable coating composition includes one or more of a polyfunctional oligomer, a reactive diluent, and a photoinitiator.

Exemplary polyfunctional oligomers includes those compounds that have at least two functional groups that may cure via a reaction initiated by a photoinitiator. In one or more embodiments, the polyfunctional oligomers include functional groups and an oligomeric portion. Suitable oligomeric portions may be prepared from silicones, epoxies, epoxies and diols, urethanes (including aliphatic urethane and aromatic urethane), polyesters, polyethers, soy oil and acrylic oligomers. In one or more embodiments, the polyfunctional oligomer may have two functional groups, in other embodiments three functional groups, in other embodiments four functional groups, and in other in other embodiments five or more functional groups.

In one or more embodiments, the polyfunctional oligomers may have a weight average molecular weight greater than 350 g/mol, in other embodiments greater than 500 g/mol, and in other embodiments greater than 2,000 g/mol. In these or other embodiments, the polyfunctional oligomers may have weight average molecular weight of less than 5,000 g/mol, in other embodiments of less than 4,500 g/mol, and in other embodiments of less than 4,000 g/mol. In one or more embodiments, the polyfunctional oligomers may have a weight average molecular weight from about 350 g/mol to about 5,000 g/mol, in other embodiments from about 500 g/mol to about 4,500 g/mol, and in other embodiments from about 2,000 g/mol to about 4,000 g/mol.

In one or more embodiments, the functional groups of the polyfunctional oligomer may be (meth)acrylate functionalities. As used herein, the term "(meth) acrylate" refers to acrylates and methacrylates and the combination of acrylates and methacrylates. Suitable polyfunctional oligomers with (meth)acrylate functionalities include, but are not limited to, epoxy acrylates, urethane acrylates (including aliphatic urethane acrylates and aromatic urethane acrylates), polyester acrylates, polyether acrylates, soy oil acrylates and straight-chained acrylic oligomers.

In one or more embodiments, the UV-curable coating composition may be described by the percent weight of the polyfunctional oligomer out of the total weight of the UV-curable coating composition. In these or other embodiments, the polyfunctional oligomer may be from about 25 to about 90 weight percent, in other embodiments from about 30 to about 80 weight percent, in other embodiments from about 40 to about 70 weight percent of the total weight of UV-curable coating composition.

As mentioned above, one or more embodiments of the UV-curable coating composition include a reactive diluent. Suitable reactive diluents include those compounds that serve to provide a lower viscosity for the UV-curable coating composition and also react during curing to form the UV-cured coating. Polyfunctional oligomers often exhibit high viscosities at room temperature, ranging from a couple of thousand to more than hundred thousand cP. The high viscosities of polyfunctional oligomers may hinder their use in coating technologies such as spray and roller coatings. This is particularly true in a high solid or 100% solid composition. Reactive diluents may be used to reduce or adjust the formulation as a replacement or in addition to solvents or water. Besides viscosity adjustment, reactive diluents are also used for optimization of crosslink density, which results in rigid or flexible polymeric networks. Reactive diluents are polymerizable components in UV curable composition. Thus, they are incorporated into the polymer network instead of evaporation under photoinitiated curing process. This feature can bring unique properties to nonwoven applications such as extremely low air porosity.

In one or more embodiments, the reactive diluent may include one or more monomers. Suitable monomers for use in the reactive diluent include, but are not limited to, mono- or multifunctional acrylates such as (meth) acrylates or (meth) acrylic acids, vinyl aromatics, divinyl ethers, and N-vinyl pyrrolidone. Exemplary (meth) acrylates include methyl acrylate, ethyl acrylate, butyl acrylate, methyl methacrylate, ethyl methacrylate, butyl methacrylate, 2-ethylhexyl acrylate, hydroxyethyl methacrylate, tripropylene glycol diacrylate, and trimethylolpropane triacrylate. Exemplary (meth) acrylic acids include acrylic acid and methacrylic acid. Exemplary vinyl aromatics include, but are not limited to, styrene, p-methylstyrene, p-methoxystyrene, b-methyl styrene, p-methyl-b-methyl styrene, a-methyl styrene and p-methoxy-b-methyl styrene.

In one or more embodiments, the UV-curable coating composition may be described by the percent weight of the reactive diluent out of the total weight of the UV-curable composition. In these or other embodiments, the reactive diluent may comprise from about 10 to about 70 weight percent, in other embodiments from about 15 to about 65 weight percent, in other embodiments from about 20 to about 60 weight percent, in other embodiments from about 25 to about 55 weight percent, in other embodiments from about 30 to about 50 weight percent of the total weight of UV-curable coating composition.

Exemplary photoinitiators for use in the UV-curable coating composition include free radical photoinitiators. In one or more embodiments, the free radical photoinitiator may be a Type I photoinitiator, a Type II photoinitiators, or a combination of a Type I photoinitiator and a Type II photoinitiator. A Type I initiator is an initiator which cleaves after excitation, yielding the initiating radical immediately. A Type II-initiator is a photoinitiator which is activated by radiation and forms free radicals by hydrogen abstraction from a second compound that becomes the actual initiating free radical. This second compound is called a polymerization synergist or co-initiator.

Exemplary Type I photoinitiators include benzoin ethers, benzil ketals, α-dialkoxy-acetophenones, α-hydroxyalkylphenones, α-aminoalkylphenones, and acylphosphine oxides.

Exemplary Type II photoinitiators include benzophenones, and thio-xanthones. Exemplary co-initiators for use with Type II photoinitiators include amines.

In one or more embodiments, the UV-curable coating composition may be described by the percent weight of the photoinitiator out of the total weight of the UV-curable coating composition. In these or other embodiments, the photoinitiator may be from about 1 to about 8 weight percent, in other embodiments from about 2 to about 7 weight percent, in other embodiments from about 3 to about 6 weight percent of the total weight of UV-curable coating composition.

In one or more embodiments, the UV-curable coating composition may include one or more additives to assist in curing, application, and/or to modify one or more properties of the photo-cured coating. Suitable additives for use in the UV-curable coating composition include one or more of surfactants, UV stabilizers, oxygen inhibitors, pigments, rheology modifiers.

In one or more embodiments, the UV-curable coating composition may be described by the percent weight of the additives out of the total weight of the UV-curable composition. In these or other embodiments, the additives may be from about 1 to about 5 weight percent and in other embodiments from about 2 to about 4 weight percent of the total weight of UV-curable composition.

Advantageously, the UV-curable composition may be prepared with little or no volatile organic compounds. Volatile organic compounds, or VOCs, are organic chemicals, typically employed as solvents, that have a high vapor pressure at ordinary room temperature. In one or more embodiments, the UV-curable coating composition less than 5 weight percent volatile organic compounds, in other embodiments less than 3 weight percent volatile organic compounds, and in other embodiments less than 1 weight percent volatile organic compounds out of the total weight of UV-curable coating composition. In one or more embodiments, the UV-curable coating composition may be essentially free of volatile organic compounds. UV-curable coating compositions that are essentially free from volatile organic compounds include only the volatile organic compounds that remain as impurities from the synthesis of the individual components of the UV-curable coating composition. In other embodiments, the UV-curable coating composition may be free of volatile organic compounds.

In one or more embodiments, the UV-curable coating composition may have a high solids content. The solid content of the UV-curable coating composition refers to the portion of the composition that is solid or will react when cured to form a solid. Non-solid components include solvents or other volatiles that may be removed, for example by evaporation, during or after the curing process. In one or more embodiments, the UV-curable coating composition has a solid content of greater than 90 weight percent, in other embodiments greater than 95 weight percent, in other embodiments greater than 98 weight percent, in other embodiments greater than 99 weight percent, in other embodiments greater than 99.9 weight percent out of the total weight of UV-curable composition. In other embodiments, the UV-curable coating composition may be entirely (100%) solids. In one or more embodiments the UV-curable coating composition is free of fillers or essentially free of fillers. Advantageously, it has been found that when a filler is included in an intermediate coating, and then a filler-free UV-cured coating composition is disposed on the intermediate coating, a facer may be prepared with excellent scratch resistance and/or a high air resistance.

The UV-curable coating composition may be applied to the intermediate layer by conventional coating techniques such as spray coating, Meyer rod coating, slot die coating, blade/knife coating, forward roll coating, reverse roll coating, gravure coating, or curtain coating. After the UV-curable coating composition has been applied, a suitable light source that for initiating the photoinitiator is applied to cure the UV-curable coating composition. In one or more embodiments, a vacuum may be employed to control the degree of penetration of the UV-curable coating composition into the intermediate layer and/or fiber mat during the coating of the UV-curable coating composition. In these or other embodiments, the vacuum is employed after or during the coating of the UV-curable coating composition and prior to the curing via a light source.

In one or more embodiments, the UV-curable coating composition may be applied to the intermediate layer with a coating weight of greater than 5 g/m$^2$, in other embodiments greater than 15 g/m$^2$, and in other embodiments greater than 20 g/m$^2$. In one or more embodiments, the UV-curable coating composition may be applied to the intermediate layer with a coating weight of less than 160 g/m$^2$, in other embodiments less than 50 g/m$^2$, and in other embodiments less than 40 g/m$^2$. In one or more embodiments, the UV-curable coating composition may be applied to the intermediate layer with a coating weight of about 5 g/m$^2$ to about 160 g/m$^2$, in other embodiments about 15 g/m$^2$ to about 50 g/m$^2$, and in other embodiments about 20 g/m$^2$ to about 40 g/m$^2$.

In one or more embodiments, the UV-curable coating composition is applied such that it has a thickness of about 5 μm to about 200 μm on the intermediate layer, in other embodiments from about 5 μm to about 100 μm, and in other embodiments from about 5 um to about 200 μm.

In one or more embodiments the light source for curing the UV-curable coating composition emits ultraviolet (UV) light. Suitable ultraviolet light sources include, but are not limited to, high or low-pressure mercury lamps, cold cathode tubes, black lights, ultraviolet LEDs, ultraviolet lasers, and combinations thereof. In one or more embodiments, the light source may have a dominant wavelength in one or more UV region selected from UV-A (400 nm to 320 nm), UV-B (320 nm to 290 nm), and UV-C (290 nm to 100 nm).

In one or more embodiments, during the curing of the UV-curable coating composition, the UV-curable coating composition may be exposed to the light source for greater than 0.2 seconds, in other embodiments greater than 0.5 seconds, and in other embodiments in other embodiments greater than 0.6 seconds. In one or more embodiments, during the curing of the UV-curable coating composition, the UV-curable coating composition may be exposed to the light source for less than 60 seconds, in other embodiments less than 20 seconds, and in other embodiments in other embodiments less than 6 seconds. In one or more embodiments, during the curing of the UV-curable coating composition, the UV-curable coating composition may be exposed to the light source for about 0.2 seconds to about 60 seconds, in other embodiments for about 0.5 seconds to about 20 seconds, and in other embodiments for about 0.6 seconds to about 6 seconds.

Figure 5:
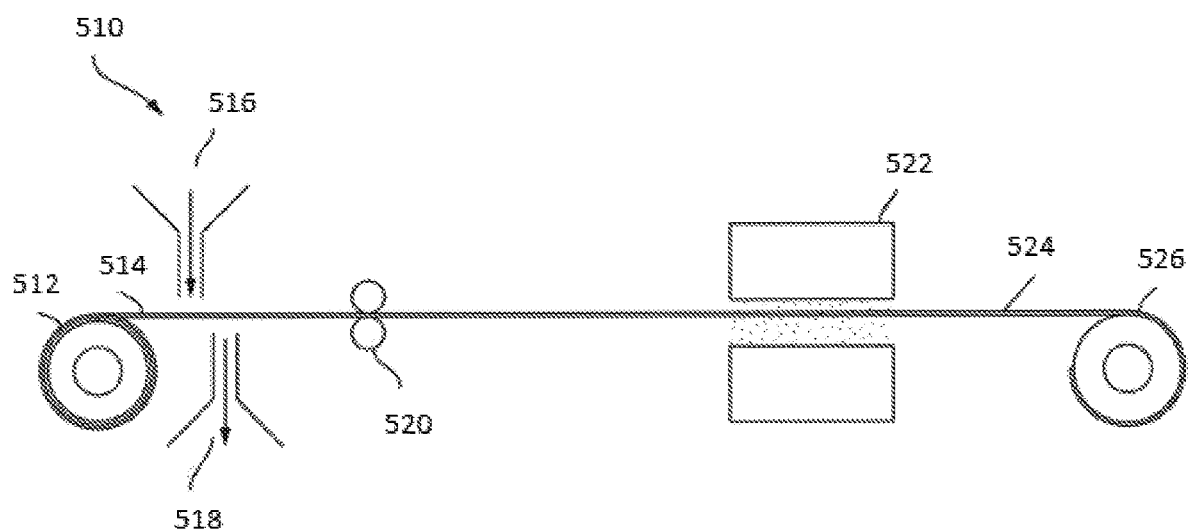
FIG. 5 illustrates a schematic view of an apparatus for preparing a UV-cured facer.

In one or more embodiments, the UV-curable coating composition may be applied to a fiber mat that includes an intermediate coating in a continuous process. FIG. 5 discloses a production line 510 that includes a first roller 512 for unwinding a roll of a fiber mat with an intermediate coating 514. The fiber mat with an intermediate coating 514 is then coated with a UV-curable coating composition (not shown) with coater 516. Coater 516 can utilize coating techniques such as spray coating, Meyer rod coating, slot die coating, blade/knife coating, forward roll coating, reverse roll coating, gravure coating, or curtain coating. An optional vacuum 518, such as a vacuum slot, may be used to control the degree of penetration of the UV-curable coating composition. After coating the fiber mat with an intermediate coating 514 with coater 516 and passing through the optional vacuum 518, the fiber mat passes through smoothing rolls 520 and then the UV-curable coating composition is cured at light source 522. After the UV-curable coating composition is cured on the fiber mat with an intermediate coating 514 to prepare the UV-coated facer 524, roller 526 may be used to wind up the UV-coated facer 524.

Figure 2:
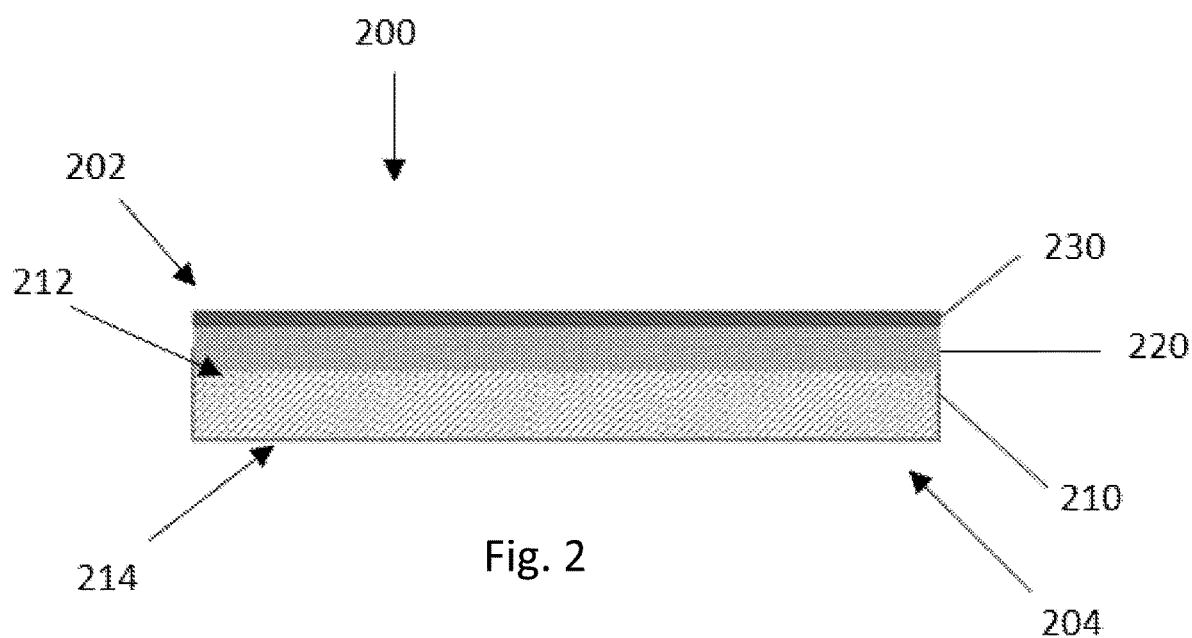
FIG. 2 illustrates a side profile of a UV-coated facer.

FIG. 2 illustrates a side profile of one or more embodiments of a UV-coated facer 200. UV-coated facer 200 includes a first side 202 and a second side 204 opposite the first side 202. The UV-coated facer includes a non-woven fiber mat or veil 210 having a first side 212 and a second side 214. The non-woven mat 210, has an intermediate coating 220 disposed on the first side 212 that includes a coating binder and a filler (for example as $CaCO_3$). The UV-coated facer 200 also has a UV curable coating composition 230 disposed on the intermediate coating 220. The UV-curable coating composition 230 can be essentially free of a filler. As indicated above, the UV-coated facers may advantageously have a high air resistance. Facers coated by conventional coating methods typically include pores, or open areas, on facer surface, which can allow air to pass through, causing relatively low Gurley air resistance. These pores are commonly phenomena in coating/painting industry, named "coating bubbles".

Figure 3:
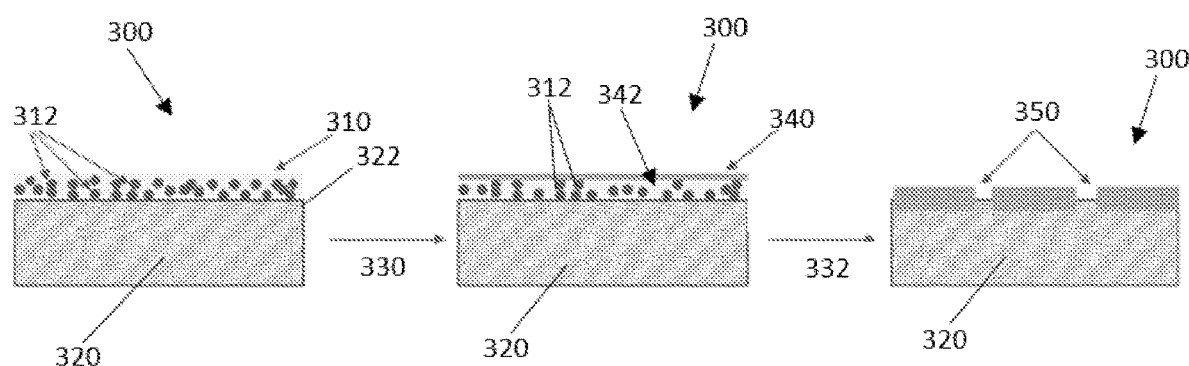
FIG. 3 illustrates a scheme showing the creation of pores or blisters in a typical coating process.

FIG. 3 illustrates how coating bubbles form during thermal curing process. After water-born mixes 310 containing water molecules 312 are coated on a surface 322 of the precursor veil 320 the facer 300 goes through a drying step 330 in an air-floated dryer (not shown). To quickly remove water by evaporation air flow temperatures (>200° C.) used in the dyers are higher than water boiling point (100° C.). During the drying step 330 water molecules 312 on the surface evaporate very fast and the facer 300 is left with a thin layer of dry coating 340 on the top of undried coating mix layer 342. When the internal water molecules 312 are evaporated at a latter section 332 of the dryer, the top dry layer 340 are broken and then blisters or bubbles 350 are created throughout the coating layers.

Figure 4:
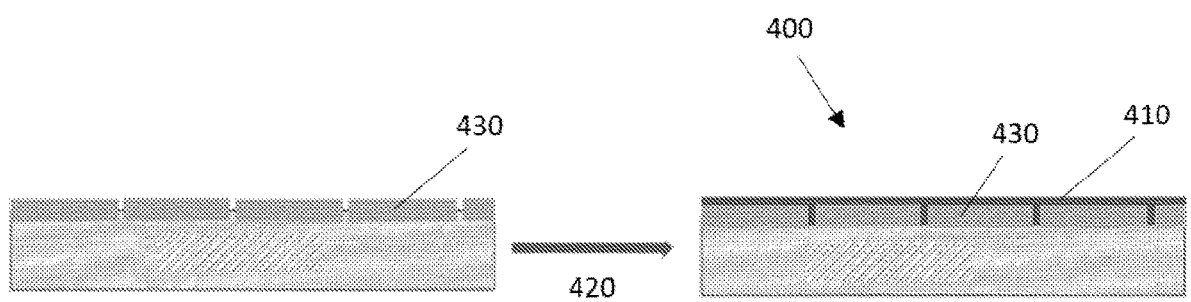
FIG. 4 illustrates a scheme showing the a continuous, blister or pore-free coating prepared using a UV-cured coating.

It has been found that the use of UV-curable coating composition may be used to prepare a facer with high air resistance by reducing or eliminating coating bubbles. The UV-curable coating composition does not require solvents or water that must be evaporated. Thus, the UV curable coating composition 410, when applied in application step 420 on the top of an intermediate layer 430, may seal the whole surface and blocked the airpaths of UV-coated facer 400 as shown in FIG. 4.

In one or more embodiments, the UV-coated facer may be characterized by the Gurley air permeation value. The Gurley air permeation value is determined by measuring the amount of time it takes 100 ml of air to pass through a 6.45 sq. cm circular area of a facer under a pressure differential of 1.22 kPa. In one or more embodiments, the UV-coated facer may have a Gurley number of greater than 5,000 s, in other embodiments greater than 20,000 s, in other embodiments greater than 50,000 s, in other embodiments greater than 75,000 s. In one or more embodiments, the UV-coated facer may have a Gurley number of greater from about 20,000 s to about 200,000 s, in other embodiments from about 50,000 s to about 150,000 s, in other embodiments greater than 75,000 s to about 110,000 s.

In one or more embodiments, the UV-coated facer may be used as a precoated facer in a construction board, such as, for example, gypsum board, foam board, or cement board. In these or other embodiments, any curing required in either the precoated layer or the UV-cured layer is completed or substantially completed prior to the use of the UV-coated facer in the preparation of the construction board.

As indicated above, the UV-coated facer includes a first side and a second side opposite the first side. In one or more embodiments, a construction board may be attached or bound to the second side of the UV-coated facer. The construction board has the UV-coated facer situated on one side of the construction board and the construction board has an opposing side opposite the UV-coated facer. In one or more embodiments, the opposing side of the construction board may have a second facer that is the same or different than the UV-coated facer. In one or more embodiments, the second facer is a paper facer, coated paper facer, foil facer, fiber facer, or coated fiber facer. In other embodiments, the opposing side of the construction board may not have a facer. In these embodiments, the construction board has a single facer. In one or more embodiments, the UV-coated facer may be included in a gypsum board or a foam board.

In one or more embodiments, the UV-coated facer may be included in in a gypsum board. The gypsum board includes a gypsum core with two opposing sides and at least one coated facer situated on one of the opposing sides. Wall boards formed of a gypsum core sandwiched between facing layers are commonly used in the construction industry as internal walls and ceilings for both residential and commercial buildings. Formulations and the design of the gypsum board may be tailored for the specific use desired for the board. In one or more embodiments, the gypsum core includes gypsum, optionally wet chopped glass fibers, water resistant chemicals, binders, accelerants, and low-density fillers. In one or more embodiments, the gypsum board may be prepared by providing a continuous layer of the UV-coated facer and depositing a gypsum slurry onto one surface of the UV-coated facer (typically the side opposite the UV-cured coating). A second continuous layer of facing material (either the UV-coated facer or a different facing material) is then applied to the opposite surface of the gypsum slurry. In this manner, the gypsum slurry is sandwiched between opposing layers of facing material. The sandwiched gypsum slurry is then adjusted to a desired thickness and dried to harden the gypsum core and form a gypsum board. In other embodiments, the application of the second facer is omitted to prepare a board with a single facer. Next, the gypsum board may be cut to predetermined dimensions (e.g., length) for end use.

In one or more embodiments, the UV-coated facer may be characterized by abrasion resistance. Abrasion resistance may be determined by an abrasion tester. An exemplary abrasion tester is the Granule Embedding Test Machine manufactured by C.G. Hill & Sons Inc. The abrasion testing may be performed by cycling wire bristle brush heads on the facer for 50 cycles. The weight of the facer before and after performing the abrasion resistance testing may be compared to determine a percent weight loss of the facer. The percent weight loss of the UV-coated facer from abrasion testing may be compared to a facer that includes a comparable or identical filled coating (a facer with just an intermediate coating). In one or more embodiments, the abrasion resistance of UV-coated facer may have a percent weight loss that is 50% less, in other embodiments 75% less, in other embodiments 75% less, in other embodiments 90% less, in other embodiments 95% less, in other embodiments 98% less, in other embodiments 99% less than a facer with a comparable or identical filled coating.

In one or more embodiments, the UV-coated facer may be included in a foam board. The foam board includes a foam core with two opposing sides and at least one coated facer situated on one of the opposing sides. Suitable foams for use in the foam board include polyurethane and polyisocyanurate (polyiso) foams. Polyisocyanurate and polyurethane foam compositions have three major components: a polyfunctional isocyanate compound, a polyol, and a blowing agent. When these three components are mixed, along with small amounts of catalysts and surfactants, a heat-generating chemical reaction causes the liquid blowing agent to boil. The resultant blowing agent vapor expands the foam to create gas-filled cells.

In one or more embodiments, the foam may be described by the isocyanate index. Those skilled in the art will appreciate that the isocyanate index is the actual number of isocyanate groups (NCO) used in the foam composition divided by the number of theoretical number of isocyanate groups required to react with the isocyanate redactable groups (polyols and $H_2O$) multiplied by 100. When the number of NCO group equals the number of OH group in a formulation, a stoichiometric NCO:OH ratio of 1.0 is realized and a polyurethane polymer/foam is produced. When the number of NCO groups is significantly more than the number of OH groups in a formulation, the excess isocyanate group reacts with itself under catalytic condition to form isocyanurate linkage and polyisocyanurate foam is produced. Typically, when the foam has an isocyanate index greater than about 200 the foam is considered a polyisocyanurate. An index of between about 250 and about 270, provides at least a 2:1 ratio of NCO groups to OH groups, which has been found to provide an appreciable combination of structure integrity, thermal strength and/or stability, and fire resistance.

As those skilled in the art will appreciate, polyisocyanurate or polyurethane foam may be prepared from separate reaction mixtures, typically refereed to an A-side stream and a B-side stream. The A-side stream includes the polyfunctional isocyanate compound, and the B-side stream includes the components reactive with the polyfunctional isocyanate compound (i.e. the polyol or other molecules that include OH groups). The blowing agent is typically included in the B-side. In one or more embodiments, a foam board that includes a coated facer may be prepared by separately preparing a mixture of B-side reactants and blowing agent and A-side reactants, mixing them to prepare a developing foam, the developing foam is then deposited onto the UV-coated facer. A second facer material (either the UV-coated facer or a different facing material) may optionally be applied to the upper surface of the developing foam. The ultimate size of the resultant foam board may be manipulated by adjusting the height of the moving form, i.e., restrained rise, by adjusting the sides of the moving form to a desired width, and by cutting the continuous foam product to a desired length.

In one or more embodiments, the foam board may be described by the density of the foam material. In one or more embodiments, the foam board may have a density or an average density greater than 6 lbs/ft$^3$. In these or other embodiments, the foam board has a density or an average density of about 6 lbs/ft$^3$ to about 25 lbs/ft$^3$, and in other embodiments about 8 lbs/ft$^3$ to about 23 lbs/ft$^3$. In other embodiments, the foam board may have a density or an average density less than 6 lbs/ft$^3$. In other embodiments, the foam board has a density or an average density of about 1 lb/ft$^3$ to about 6 lbs/ft$^3$, and in other embodiments about 2 lbs/ft$^3$ to about 5 lbs/ft$^3$.

The inventive concepts have been described above both generally and with regard to various exemplary embodiments. Although the general inventive concepts have been set forth in what is believed to be exemplary illustrative embodiments, a wide variety of alternatives known to those of skill in the art can be selected within the generic disclosure. Additionally, following examples are meant to better illustrate the present invention, but do in no way limit the general inventive concepts of the present invention.

Example 1

TABLE 1

Exemplary UV-Curable Coating

| Materials | Types | Solid | Wt. Percentages |
|---|---|---|---|
| Bisphenol A Epoxy Diacrylate | Reactive Oligomers | "100%" | 46% |
| Tripropylene Glycol Diacrylate (TPGDA) | Reactive Dilute | | 46% |
| 50% 1-Hydroxy-cyclohexyl-phenyl-ketone/50% Benzophenone | Photo-initiator | | 4% |
| N-Methyldiethanolamine | Amines | | 4% |

Table 1 provides exemplary UV curable coating compositions of Sample 1-5. The UV-curable coating includes only reactive components and photoinitiators. Bisphenol A Epoxy Diacrylate is an epoxy acrylate and has a viscosity is too high to be measured at room temperature. Thus, it cannot be used for coating directly. TPGDA (Tripropylene Glycol Diacrylate) is bifunctional acrylate monomer useful as a reactive diluent, with a viscosity of about 3 cP. When these two chemicals are mixed at 50/50 ratio, the viscosity of the mix is ~500 cP, well within the workable range of some coating methods such as Meyer rod coating. 1-Hydroxycyclohexyl-phenyl-ketone/50% Benzophenone and N-Methyldiethanolamine are paired as Type II (co-initiator) photoinitiators.

TABLE 2

Add-on Weight, Curing speed and Gurley Air Resistance of Facers without/with UV Curable Coating

|  | Comp. Example 1 | Sample 1 | Sample 2 | Sample 3 | Sample 4 | Sample 5 |
|---|---|---|---|---|---|---|
| Add-on Weight (g/m$^2$) | 0 | 79.7 | 55.5 | 33.9 | 23.1 | 20.0 |
| Belt Speed (ft/min) | N/A | 65 | 65 | 65 | 65 | 200 |
| Gurley air Permeation (s) | 700-1,000 | 102,186 | 78,545 | 93,717 | 65,157 | 85,174 |

Facers that include a filled coating typically suitable for use as high-density polyiso facers were used as coating substrates, with a facer not including the UV-curable coating composition constituting Comparative Example 1. Five UV-coated samples were prepared by Meyer rods with progressively lower add-on weight of UV curable coatings, following by cured with a 2-feet long UV light. The coating film thickness was controlled to fall between 0.1 mil to 10 mil within ±0.1 mil accuracy.

Samples 1 to 4 were UV cured with belt speed of 65 ft/min and the latter one (Sample 5) was UV cured with belt speed of 200 ft/min, equaling to 1.8 s and 0.6 s of exposure time, respectively, beneath curing light. Samples 1-5 were fully covered with a thin solid layer of UV-curable coating on top of HD Polyiso facer. All of UV coated samples showed impressively high Gurley numbers (Table 2), in the range of 65 to 100 times higher than non-UV coated HD Polyiso facers, especially Sample 4 and Sample 5, with only ~20 g/m$^2$ of add-on weight (equals to ~20 um coating thickness).

Figure 6:
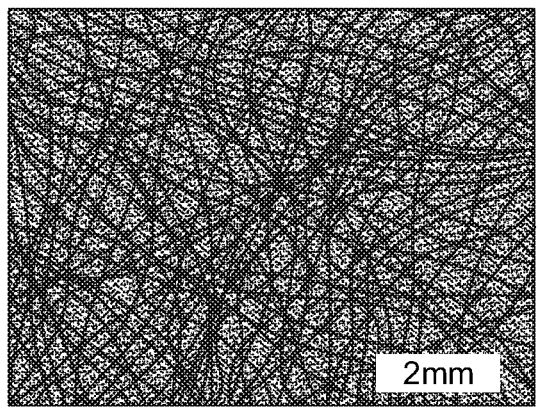
FIG. 6 illustrates microscopy images of a control coated facer and two facers prepared by one or more embodiments of the UV-coated facer.
Figure 6:
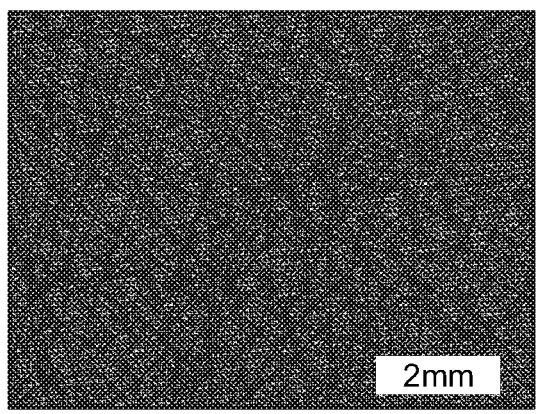
Figure 6:
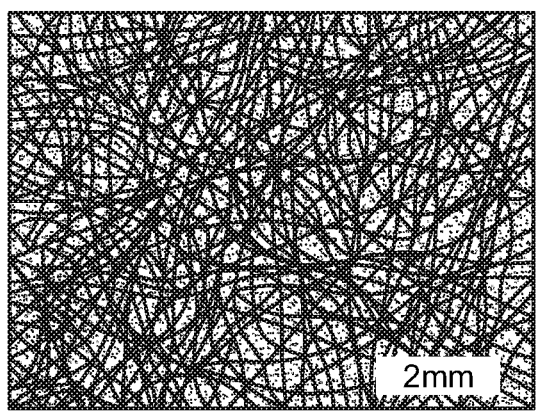

FIG. 6 illustrates microscopy images demonstrating the mechanism of high air resistance. Image A illustrates an HD poyiso facer substrate (no UV-coating). There are a number of pores on its surface that act as airpaths and are responsible for low air resistance. Image B illustrates a surface microscopy image of Sample 3, wherein the polyiso substrate was fully covered with a thin layer of UV-curable coating. As a result, no unfilled pore could be found when looking through the top. This explains why extremely high Gurley air permeation numbers (97,717 s) were obtained. Sample 4 is illustrated as image C. Compared to Sample 3, there is no clear layer of UV-curable coating on top of the facer substrate. This observation is consistent with the relatively low UV-curable coating add-on weight of this sample. However, the UV-curable resin appears to stay inside the pore areas, filling the holes and blocking airpaths. Thus, high air resistance (65,157 s) performance was obtained from this sample as well.

Example 2—Improve Abrasion Resistance for Gypsum Facers

Table 3 provides the UV-curable coating recipe used in Samples 6-9. This recipe only contains reactive components and photoinitiators. Silicone modified epoxy acrylate is used as reactive oligomer. Isobornyl methacrylate is bifunctional acrylate monomer. A liquid photoinitiator blend package is used as photoinitiators.

TABLE 3

Recipe of UV curable coating for Gypsum Facer

| Materials | Types | Solid | Percentage |
|---|---|---|---|
| Silicone modified Epoxy acrylate | Reactive Oligomers | "100%" | 45% |
| Isobornyl methacrylate (IBOMA) | Reactive Dilute | | 55% |
| Liquid photoinitiator blend | Photo-initiator | | 5% |

Facers that include a filled coating typically suitable for use as gypsum facers (gypsum facer) were used as coating substrates. To better control add-on weight, this mix was sprayed onto the surface of the gypsum facer, following by cured with a 2-feet long UV light at 50 ft/min. Five samples were prepared with add-on weights of UV curable coating ranging from 6.2 to 153.1 g/m$^2$ (Table 4).

TABLE 4

Add-on Weight, Abrasion Cycle and Weight Loss of Gypsum Facers without/with UV Curable Coating

|  | Gypsum Facer | Sample 1 | Sample 2 | Sample 3 | Sample 4 |
|---|---|---|---|---|---|
| Add-on Weight (g/m$^2$) | 0 | 6.2 | 16.0 | 20.6 | 153.1 |
| Abrasion Cycle | 46 | 50 | 50 | 50 | 50 |
| Weight loss | 39.04% | 19.07% | 2.94% | 2.29% | 0.38% |

The abrasion tests were performed by Granule Embedding Test Machine manufactured by C.G. Hill & Sons Inc. The brush heads are made from tempered steel, with wire bristle brush that cycle together for uniform granule adhesion testing results. The test stopped when wire brush went through the facer or completed after 50 cycles. The weight loss was calculated by following equation:

$$\text{Weight loss\%} = \frac{\text{Initial weight} - \text{Final weight}}{\text{Initial weight}}$$

The abrasion testing results are summarized in Table 4. As is shown in Table 4, the abrasion resistance improved when the UV-curable coating was applied onto the gypsum facer. The abrasion test of the gypsum facer without UV-curable coatings was stopped after 46 cycles because the testing areas were almost gone. The weight loss was close to 40%. When 6.2 g/m$^2$ of UV coating was applied, Sample 1 completed 50 cycles of abrasion test and the weight loss was reduced to 19.07%. Sample 2 and Sample 3 represented continuous improvement of weight losses with higher add-on weight. As the coating weight was increased to 153 g/m$^2$ for Sample 4, the sample remained almost intact after 50 abrasion cycles, reaching only 0.38% of weight loss.

This example clearly demonstrates that abrasion resistance of non-woven facers can be improved by UV curable coatings.

Unless otherwise indicated herein, all sub-embodiments and optional embodiments are respective sub-embodiments and optional embodiments to all embodiments described herein. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative process, and illustrative examples shown and described. Accordingly, departures may be made from such details without departing from the spirit or scope of the applicant's general disclosure herein.

What is claimed is:

1. A UV-cured coated facer comprising:
   a non-woven mat having a first side and a second side;
   50 $g/m^2$ to 300 $g/m^2$ of a cured intermediate coating disposed on the first side of the non-woven mat; wherein the cured intermediate coating comprises 5.5 to 20 weight percent of a coating binder and at least 75 weight percent of a filler, wherein the coating binder comprises a water-based polymer emulsion or solution; and
   a UV-cured coating composition disposed on the cured intermediate coating, wherein said UV-cured coating composition is essentially free of a filler, wherein the UV-cured coating composition comprises the reaction product of at least one polyfunctional oligomer, at least one reactive diluent, and at least one photoinitiator blend comprising a Type II photoinitiator and an amine, and is applied to the intermediate layer with a thickness of 5 µm to 100 µm;
   wherein the UV-cured coated facer has a Gurley air permeation number from 50,000 s to 150,000 s.

2. The UV-cured coated facer of claim 1, where the UV-cured coated facer has a percent weight loss that is 50% less than a facer with a comparable filled coating when an abrasion test is performed by cycling a wire bristle brush head on the facer for 50 cycles.

3. The UV-cured coated facer of claim 1, wherein the UV-cured coating composition has a solids content with a weight percent greater than 90%.

4. The UV-cured coated facer of claim 1, where the reactive diluent is selected from (meth) acrylates, (meth) acrylic acids, vinyl aromatics, divinyl ethers, and N-vinyl pyrrolidone, and combinations thereof.

5. The UV-cured coated facer of claim 1, where the polyfunctional oligomer is selected from epoxy acrylates, urethane acrylates, polyester acrylates, polyether acrylates, soy oil acrylates and straight-chained acrylic oligomers.

6. The UV-cured coated facer of claim 1, where the UV-cured coating composition further comprises one or more additives selected from the group consisting of surfactants, UV stabilizers, oxygen inhibitors, and pigments.

7. A construction board that includes the UV-cured coated facer of claim 1.

8. The construction board of claim 7, wherein the second side of the coated facer is attached to a gypsum board.

9. The construction board of claim 7, wherein the second side of the coated facer is attached to a polyisocyanurate board.

10. A method for preparing a UV-cured coated facer comprising:
    providing a non-woven fiber mat;
    forming an intermediate coating on the non-woven fiber mat by coating the non-woven fiber mat with 50 $g/m^2$ to 300 $g/m^2$ of a coating composition including 5.5 to 20 weight percent of a coating binder and at least 75 weight percent of a filler;
    curing the intermediate coating composition on the non-woven fiber mat;
    coating the intermediate coating with UV-curable coating composition, wherein the UV-curable coating composition comprises at least one polyfunctional oligomer, at least one reactive diluent, and at least one photoinitiator blend comprising a Type II photoinitiator and an amine, and is essentially free of a filler, wherein the UV-curable coating composition is applied to the intermediate layer at a thickness of 5 µm to 100 µm; and
    supplying a UV-light source to cure the UV-curable coating composition, forming a UV-cured coated facer;
    wherein the UV-cured coated facer has a Gurley air permeation number from 50,000 s to 150,000 s.

11. The method of claim 10, where the UV-curable coating composition has a solids content with a weight percent of at least 90%.

12. The method of claim 11, where wherein said UV-curable coating composition has a solids content with a weight percent of at least 99%.

13. The method of claim 10, where the reactive diluent is selected from (meth) acrylates, (meth) acrylic acids, vinyl aromatics, divinyl ethers, and N-vinyl pyrrolidone, and combinations thereof.

14. The method of claim 10, where the polyfunctional oligomer is selected from epoxy acrylates, urethane acrylates, polyester acrylates, polyether acrylates, soy oil acrylates and straight-chained acrylic oligomers.

15. The method of claim 10, where the UV curable coating composition further comprises an additive selected from the group consisting of surfactants, UV stabilizers, oxygen inhibitors, and pigments.

16. The method of claim 10, where the non-woven fiber mat is a non-woven glass fiber mat.

* * * * *